(12) United States Patent
Martel et al.

(10) Patent No.: US 9,321,190 B2
(45) Date of Patent: Apr. 26, 2016

(54) TEMPERATURE-CONTROLLED THERMOKINETIC MIXER

(71) Applicant: PHOENIX INNOVATION TECHNOLOGY INC., Westmount (CA)

(72) Inventors: Sylvain Martel, Sainte-Therese (CA); Stephen Murphy, Montreal (CA)

(73) Assignee: Phoenix Innovation Technology Inc., Westmount Quebec (CA)

( * ) Notice: Subject to any disclaimer, the term of this patent is extended or adjusted under 35 U.S.C. 154(b) by 0 days.

(21) Appl. No.: 14/422,629

(22) PCT Filed: Oct. 24, 2013

(86) PCT No.: PCT/CA2013/050808
§ 371 (c)(1),
(2) Date: Feb. 19, 2015

(87) PCT Pub. No.: WO2014/063254
PCT Pub. Date: May 1, 2014

(65) Prior Publication Data
US 2015/0231800 A1    Aug. 20, 2015

Related U.S. Application Data

(60) Provisional application No. 61/717,878, filed on Oct. 24, 2012.

(51) Int. Cl.
*B29B 7/38* (2006.01)
*B01F 15/06* (2006.01)
(Continued)

(52) U.S. Cl.
CPC .............. *B29B 7/38* (2013.01); *B01F 7/00425* (2013.01); *B01F 15/00337* (2013.01); *B01F 15/068* (2013.01); *B29B 7/726* (2013.01); *B29B 13/02* (2013.01); *B01F 2215/0049* (2013.01)

(58) Field of Classification Search
CPC .................................. B01F 15/068; B29B 7/38
USPC .............................................. 366/147, 325.92
See application file for complete search history.

(56) References Cited

U.S. PATENT DOCUMENTS 1,587,840 A * 6/1926 Kilmer ........................... 366/147
3,734,471 A * 5/1973 Engels ........................ 366/170.3
(Continued)

FOREIGN PATENT DOCUMENTS

DE         1200521    *  7/1964
JP         2215376       8/1990
(Continued)

OTHER PUBLICATIONS

International Preliminary Report on Patentability from PCT/CA2013/050808, parent of this matter PDSD, mailed Sep. 18, 2014, 8 pages.
(Continued)

*Primary Examiner* — Charles Cooley
*Assistant Examiner* — Marc C Howell
(74) *Attorney, Agent, or Firm* — Pauly, Devries Smith & Deffner, LLC

(57) ABSTRACT

A shaft assembly for use in a temperature-controlled K-mixer is provided, along with the mixer including the shaft assembly. The shaft assembly includes an inner hollow shaft defining an inner passage, and an outer hollow shaft coaxially surrounding the inner hollow shaft. An outer passage extends between the inner and outer hollow shafts. The shaft also includes a plurality of blades extending from the outer hollow shaft, for mixing the material. Each of the blades is provided with channels. The inner passage, the channels and the outer passage form a continuous flow path allowing a pressurized fluid to circulate within inner and outer hollow shafts and the blades, for controlling temperature of the shafts and the blades. The channels allow a flow of the fluid in the blades in an opposite direction of a rotational direction of the shaft assembly.

30 Claims, 13 Drawing Sheets

(51) Int. Cl.
    *B01F 15/00*      (2006.01)
    *B01F 7/00*      (2006.01)
    *B29B 13/02*      (2006.01)
    *B29B 7/72*      (2006.01)

(56) References Cited

U.S. PATENT DOCUMENTS

| | | | | |
|---|---|---|---|---|
| 3,845,940 | A * | 11/1974 | Lodige et al. | 366/147 |
| 3,884,294 | A * | 5/1975 | Lodige et al. | 165/92 |
| 4,527,902 | A * | 7/1985 | Christen | 366/170.4 |
| 6,105,490 | A * | 8/2000 | Horn et al. | 99/472 |
| 6,364,520 | B1 | 4/2002 | Steele | |
| 7,540,651 | B2 | 6/2009 | Matsumoto et al. | |
| 7,585,102 | B2 * | 9/2009 | Bacher et al. | 366/147 |
| 7,896,638 | B2 * | 3/2011 | Morimoto | 425/209 |

FOREIGN PATENT DOCUMENTS

| | | |
|---|---|---|
| JP | 2609578 | 5/1997 |
| WO | 2011113148 | 9/2011 |

OTHER PUBLICATIONS

International Search Report from PCT/CA2013/050808, parent of this matter PDSD, mailed Dec. 13, 2013, 3 pages.

Reply to Written Opinion Under Section 34 of the PCT, PCT/CA2013/050808, parent of this matter PDSD, submitted Jun. 6, 2014, 8 pages.

Written Opinion of the International Searching Authority from PCT/CA2013/050808, parent of this matter PDSDO, mailed Dec. 13, 2013, 6 pages.

* cited by examiner

TEMPERATURE-CONTROLLED THERMOKINETIC MIXER

CROSS-REFERENCE TO RELATED APPLICATIONS

This application is a national stage application under 35 U.S.C. 371 of International Patent Application Serial No. PCT/CA2013/050808, filed Oct. 24, 2013, which claims priority from U.S. Patent Application No. 61/717,878, filed Oct. 24, 2012, the disclosures of which are incorporated herein by reference.

FIELD OF THE INVENTION

The present invention generally relates to a thermal kinetic mixer, or thermokinetic mixer, also named hereinafter K-mixer. More particularly, the invention relates to a shaft assembly and to a K-mixer having improved features for controlling the temperature of the blades of the K-mixer while the K-mixer is operating.

BACKGROUND OF THE INVENTION

K-mixers are high intensity mixers (see U.S. Pat. No. 4,332,479 to Crocker et al.) that can be used, among other applications, for mechanical regenerating of rubber (see U.S. Pat. No. 5,883,140 (Fisher et al.); U.S. Pat. No. 7,342,052 (Fulford et al.); or Applicant's application WO 2011/113148). K-mixers differ from agitators and kneading apparatuses in that they can be operated at higher RPMs (revolutions per minute) and high moments of force (torque). Their components are thus subjected to high temperatures, and in rubber regeneration applications, the thermal inertia of the components prevents operating the K-mixer in a semi-continuous process environment. A semi-continuous process is typically a batch process which can be realised without having to stop or minimally stopping equipment in between batches. In order to mitigate this problem, a cooling jacket can be provided around the mixing chamber and/or a coolant can be circulated in the shaft. While these solutions help to alleviate problems related to over-heating in the K-mixer, they are still insufficient for some applications, especially for rubber regeneration.

Agitators, kneaders, bladed rotors or other sorts of apparatuses including temperature-controlled systems have been disclosed in the past, such as in U.S. Pat. No. 4,040,768 (Christian); U.S. Pat. No. 4,856,907 (Moriyama) or U.S. Pat. No. 7,540,651 B2 (Matsumoto et al.). However, none of these US patents discloses temperature-controlled systems adapted for K-mixers.

Referring to U.S. Pat. No. 4,856,907 to Moriyama, a kneader is disclosed. The kneader has a shaft 5 on which external members 7 are fitted. The rotor shaft 5 is provided with heat transfer passages 13, 14 linked to spaces 9 of the blades 10, which are integrally formed by the external members 7. As shown in FIG. 2 of the patent, the passages 13, 14 of the shaft 5 are located on the central axis of the shaft, meaning that the outer periphery of the shaft where there are no blades is not thermally-controlled by the heat transfer liquid. In addition, the space 9 of the blades is completely hollow, the heat transfer liquid freely circulating in the space, which is does not provide for an efficient flow of fluid within the blade. In addition, the flow of fluid within the external members 7 cannot be adjusted.

Referring to U.S. Pat. No. 7,540,651 to Matsumoto et al., an agitator is disclosed, especially adapted for agitating fluids, such as inks and coloring liquids. The agitator includes a rotating shaft 3 and a flat paddle blade 4. The shaft 3 includes inner and outer pipes 3a, 3b, and an integrally formed paddle with a passage 12 for a coolant medium. The passage 12 zigzags in the paddle, which results in the coolant circulating in different directions, clockwise and counter-clockwise, within the paddle. The configuration of the passage therefore requires the coolant to be circulated at high pressure to be able to cool the paddle efficiently. In addition, the blade 4 is integrally formed with the shaft, and is not adapted for K-mixers, for which blades must sometimes be replaced. Furthermore, agitators typically have a single blade and are subject to low intensity loads with a single blade integrally formed at the end of the shaft, oriented in the direction of the shaft. Conversely, K-mixers have typically a plurality of blades that are perpendicular to the shaft which rotate at high RPMs and generate high moments of force.

In view of the above, there is thus a need for an improved K-mixer that would be able to overcome or at least minimize some of the above-discussed concerns. It would be desirable for the improved K-mixer to allow a temperature control of the shaft and of the independent blade(s), and to improve flow of a heat transfer fluid within the shaft assembly and the blade assembly so as to increase heat transfer exchanges. Furthermore, there is also a need for a K-mixer which would facilitate replacement of the blades when the hard facing begins to wear down, and additionally would allow for a custom blade design and replacement. Additionally, a K-mixer allowing temperature control of each blade individually would prove beneficial.

SUMMARY OF THE INVENTION

In accordance with the present invention, there is provided a temperature-controlled shaft assembly of a K-mixer, such as for use in a rubber regenerating process. The K-mixer disclosed herein is an improvement of the K-mixer disclosed in Applicant's application WO 2011/113148, the content of which is incorporated herewith by reference.

The improvement consists of a temperature-controlled shaft assembly, embedded inside the shaft and blades of the K-mixer, in order to efficiently control and modify the temperature of the shaft and blades while the K-mixer is functioning.

According to the invention, there is provided a thermokinetic mixer, or K-mixer, comprising a substantially cylindrical stationary chamber for containing the material, the chamber having a chamber inlet for receiving the material and a chamber outlet for discharging the material. The K-mixer includes a shaft assembly coaxial with the chamber and having a portion extending in the stationary chamber. The shaft assembly comprises an inner hollow shaft defining an inner passage which extends therein. The shaft assembly also comprises an outer hollow shaft coaxially surrounding and spaced away from the inner hollow shaft. The outer hollow shaft forming an outer passage with the inner hollow shaft, the outer passage extending between the inner and outer hollow shafts, the inner and outer passages are in fluid communication with each other. The shaft assembly has a motor end connectable to a motor for rotating the shaft assembly, and a joint end connectable to a rotary joint. The joint end has a fluid inlet and a fluid outlet, each communicating with a respective one of the inner and outer passages. The shaft assembly includes a plurality of blades extending from the outer hollow shaft in the stationary chamber, for mixing the material. Each of the blades is provided with channels extending therein, a channel inlet communicating with one of the passages, and a channel outlet communicating with the other one of the passages. The inner passage channels and the outer passage form a continuous flow path allowing a pressurized fluid to circulate within inner and outer hollow shafts and through the plurality of blades, from the fluid inlet to the fluid outlet, for controlling a temperature of the shafts and a temperature of the blades. The channels allow a flow of the fluid in the blades in an opposite direction of a rotational direction of the shaft assembly.

In an embodiment, each of the blades has a body with a mounting end operatively mounted to the outer hollow shaft, and an outer end opposed to the mounting end. At least some of the channels of each blade extend from the mounting end to the outer end.

In an embodiment, the channels are shaped and configured as concentric U-shaped channels.

In an embodiment, each of the blades comprises opposed first and second faces which are substantially parallel to a transverse cross-section the hollow shafts. Each blade includes a cavity formed between said lateral faces; and a plurality of sidewalls extend within the cavity from the first to the second lateral face. The sidewalls delimit the channels.

In an embodiment, each of the blades comprises a mounting mechanism for removably connecting the blade to the outer hollow shaft. The mounting mechanism allows replacement of the blade.

In an embodiment, the shaft assembly includes pairs of connecting tubes associated with the respective blades. The connecting tubes extend radially relative to the hollow shafts. The connecting tubes connect the channel inlets and the channel outlets to one of the inner and outer passages, respectively.

In an embodiment, each of the blades is provided with a flow adjustment device sized to individually control the flow of fluid within each blade. In an embodiment, the flow adjustment device is a gasket.

In an embodiment, the shaft assembly includes a return flow adjustment mechanism disposed between the inner and outer passages, for controlling flow of the fluid between the inner and the outer passages and an exit flow of the blades.

In an embodiment, the cross-sectional area of the inner passage substantially matches cross-sectional area of the outer passage.

The fluid can be a cooling or a heating fluid.

In an embodiment, the outer surfaces of the blades are non-uniform, and some or all can be twisted longitudinally.

In an embodiment, the K-mixer can include a temperature sensor for sensing the temperature of at least one of the blades.

One of the advantages of the K-mixer disclosed herein is that the surface temperature of the shaft and blades of the K-mixer can be controlled (temperature is maintained constant, decreased or increased) and that the inertial effects caused by the rotational movement of the shaft are used to assist with the circulation of the fluid within the blades. Consequently, if the blades are cooled efficiently, the K-mixer can then be operated in a semi-continuous process environment with consistent temperatures ensuring reliable processing parameters and therefore dependable quality of the regenerated rubber.

In an embodiment, a temperature-controlled K-mixer for thermally and kinetically treating a material, is provided. The K-mixer comprising: a substantially cylindrical stationary chamber for containing the material, the chamber having a chamber inlet for receiving the material and a chamber outlet for discharging the material; a shaft assembly coaxial with the chamber and having a portion extending in the stationary chamber, the shaft assembly comprising: an inner hollow shaft defining an inner passage-extending therein; an outer hollow shaft coaxially surrounding and spaced away from the inner hollow shaft, the outer hollow shaft forming an outer passage with the inner hollow shaft, the outer passage extending between the inner and outer hollow shafts, the inner and outer passages being in fluid communication with each other; a motor end connectable to a motor for rotating the shaft assembly; a joint end-connectable to a rotary joint, the joint end having a fluid inlet and a fluid outlet, each communicating with a respective one of the inner and outer passages; and a plurality of blades extending from the outer hollow shaft in the stationary chamber, for mixing the material, the blades being respectively provided with a plurality of channels extending therein, a channel inlet communicating with one of the passages, and a channel outlet communicating with the other one of the passages; wherein the K-mixer is adapted for operating at speeds greater than 400 RPM and wherein the inner passage, the channels and the outer passage form a continuous flow path allowing a pressurized fluid to circulate within inner and outer hollow shafts and through the plurality of blades, from the fluid inlet to the fluid outlet, for controlling a temperature of the shafts and a temperature of the blades, the channels substantially concentric, allowing a flow of the fluid in the blades in an opposite direction of a rotational direction of the shaft assembly.

In an embodiment, each of the blades has a body with a mounting end operatively mounted to the outer hollow shaft, and an outer end opposed to the mounting end, at least some of the channels of each blade extending from the mounting end to the outer end.

In an embodiment, for each of the blades, the channels are shaped and configured as U-shaped channels.

In an embodiment, each of the blades comprises: opposed first and second lateral faces which are substantially parallel to a transverse cross-section the hollow shafts; a cavity formed between said lateral faces; and a plurality of sidewalls extending within the cavity from the first to the second lateral face, said sidewalls delimiting the channels.

In an embodiment, at least one of the sidewalls has an I-shape or an L-shape.

In an embodiment, each of the blades comprises a mounting mechanism removably connecting the blade to the outer hollow shaft, for allowing replacement of the blade.

In an embodiment, the temperature-controlled K-mixer comprises pairs of connecting tubes associated with the respective blades, the connecting tubes extending radially relative to the hollow shafts, the connecting tubes connecting the channel inlets and the channel outlets to one of the inner and outer passages, respectively.

In an embodiment, each of the blades is provided with a flow adjustment device sized to individually control the flow of fluid within each blade.

In an embodiment, the fluid inlet is connected to the inner passage and the fluid outlet is connected to the outer passage, the fluid being fed through the inner passage and returning to the outlet through the outer passage.

In an embodiment, for each of the blades, the channel inlet communicates with the inner passage and the channel outlet communicates with the outer passage.

In an embodiment, the fluid inlet is connected to the outer passage and the fluid outlet is connected to the inner passage, the fluid being fed through the outer passage and returning to the fluid outlet through the inner passage.

In an embodiment, for each of the blades, the channel inlet communicates with the outer passage and the channel outlet communicates with the inner passage.

In an embodiment, the temperature-controlled K-mixer comprises a return flow adjustment mechanism disposed between the inner and outer passages, for controlling flow of the fluid between the inner and the outer passages and an exit flow of the blades.

In an embodiment, at least one of the blades extends radially relative to the outer hollow shaft.

In an embodiment, at least one of the blades extends at an angle relative to a radial direction from the outer hollow shaft.

In an embodiment, said chamber comprises opposed end sidewall, and wherein said at least one of the blades comprises two blades respectively positioned close to said sidewalls, acting as scrapers to push the material toward a center of mixing chamber, away from the sidewalls.

In an embodiment, cross-sectional area of the inner passage substantially matches cross-sectional area of the outer passage.

In an embodiment, of the channels are sized and shaped to promote fluid flow within the blades.

In an embodiment, the temperature-controlled K-mixer comprises a fluid source for providing the fluid with the continuous flow path.

In an embodiment, the fluid source is a source of cooling fluid.

In an embodiment, the fluid source is a source of heating fluid.

In an embodiment, the outer surfaces of the blades are non-uniform.

In an embodiment, at least one of the blades is twisted longitudinally.

In an embodiment, the temperature-controlled K-mixer comprises at least one temperature sensor for sensing the temperature of at least one of the plurality of blades.

The improvements of the K-mixer and their advantages will be better understood upon reading the following description made with reference to the accompanying drawings.

DESCRIPTION OF EMBODIMENTS

In the following description, the same numerical references refer to similar elements. The embodiments described in the present description are embodiments only; they are given solely for exemplification purposes.

Figure 1:
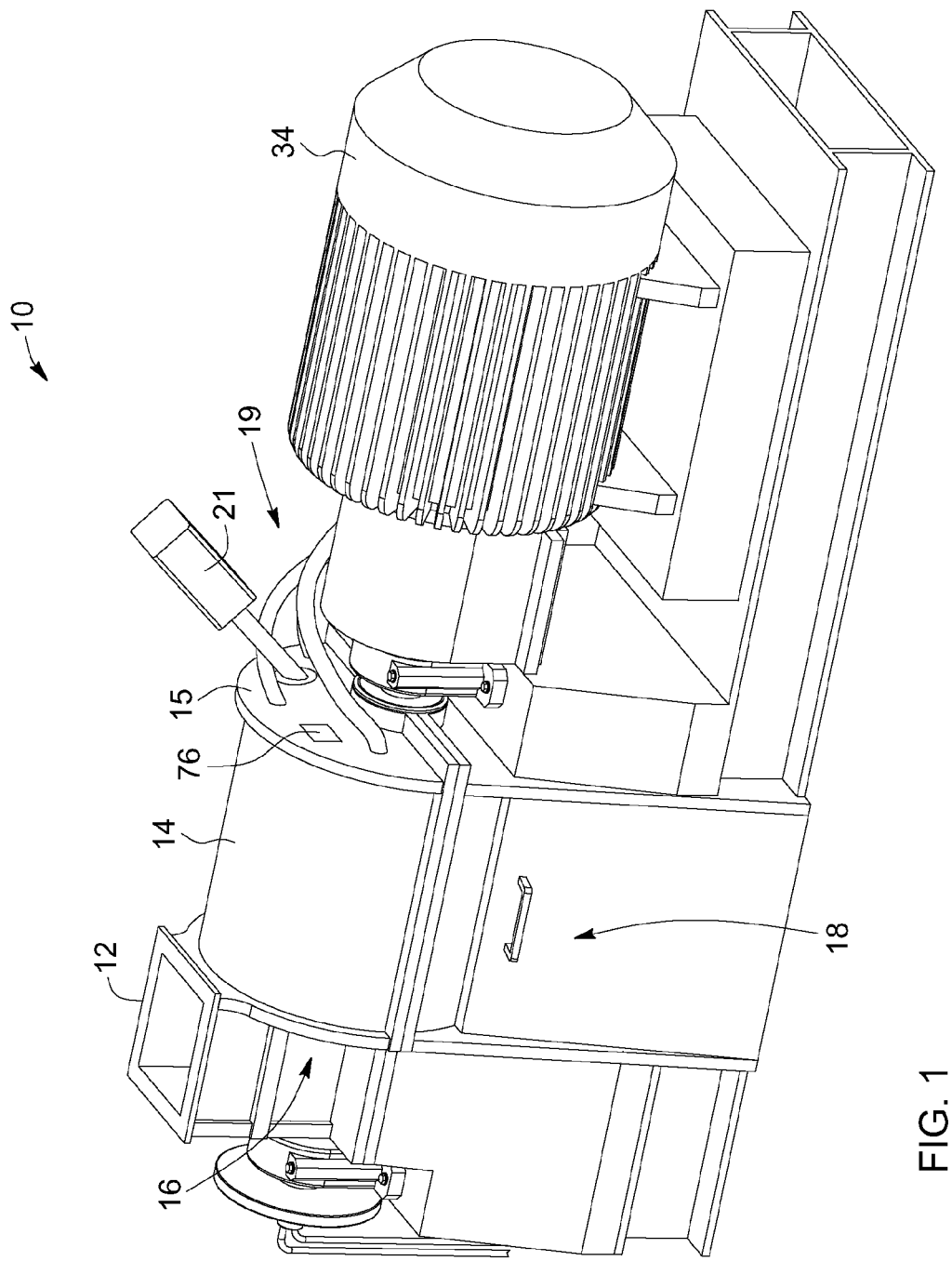
FIG. 1 is a perspective view of a K-mixer.

Referring to FIG. 1, a K-mixer (10), or K-mixer, is shown. This K-mixer (10) is temperature-controlled, and is for thermally and kinetically treating a material, such as a particulate or granular material. "Treating" the material includes beating, mixing or agitating and shearing without being limited to such actions. The K-mixer (10) described herein below is especially adapted for regenerating crumb rubber. The material can include a single component, or a mix of various components. In the case of rubber regeneration, the material includes oil and crumb rubber from recycled rubber.

The K-mixer (10) includes a hopper (12), through which the material is fed to the mixer (10). By "hopper", it is meant a component which allows directing or guiding the material into the mixer (10). A substantially cylindrical stationary chamber (14), also referred to as a "mixing" chamber, allows to contain the material. The chamber (14) has a chamber inlet (16) communicating with the hopper (12), and a chamber outlet (18) for discharging the material. A shaft assembly extends inside the chamber (not shown in the figure), and will be described in more detail with reference to FIGS. 2 to 6. The motor 34 allows rotating the shaft assembly (shown in FIG. 2). The mixer (10) also can include a cooling system (19). The cooling system can include a plurality of injection nozzles, which can be located on the motor side and/or on the screw feed/rotation joint side of the mixing chamber. The mixing chamber can be substantially airtight, and a ram valve (21) can be used for the vacuum of the mixing chamber.

Figure 2:
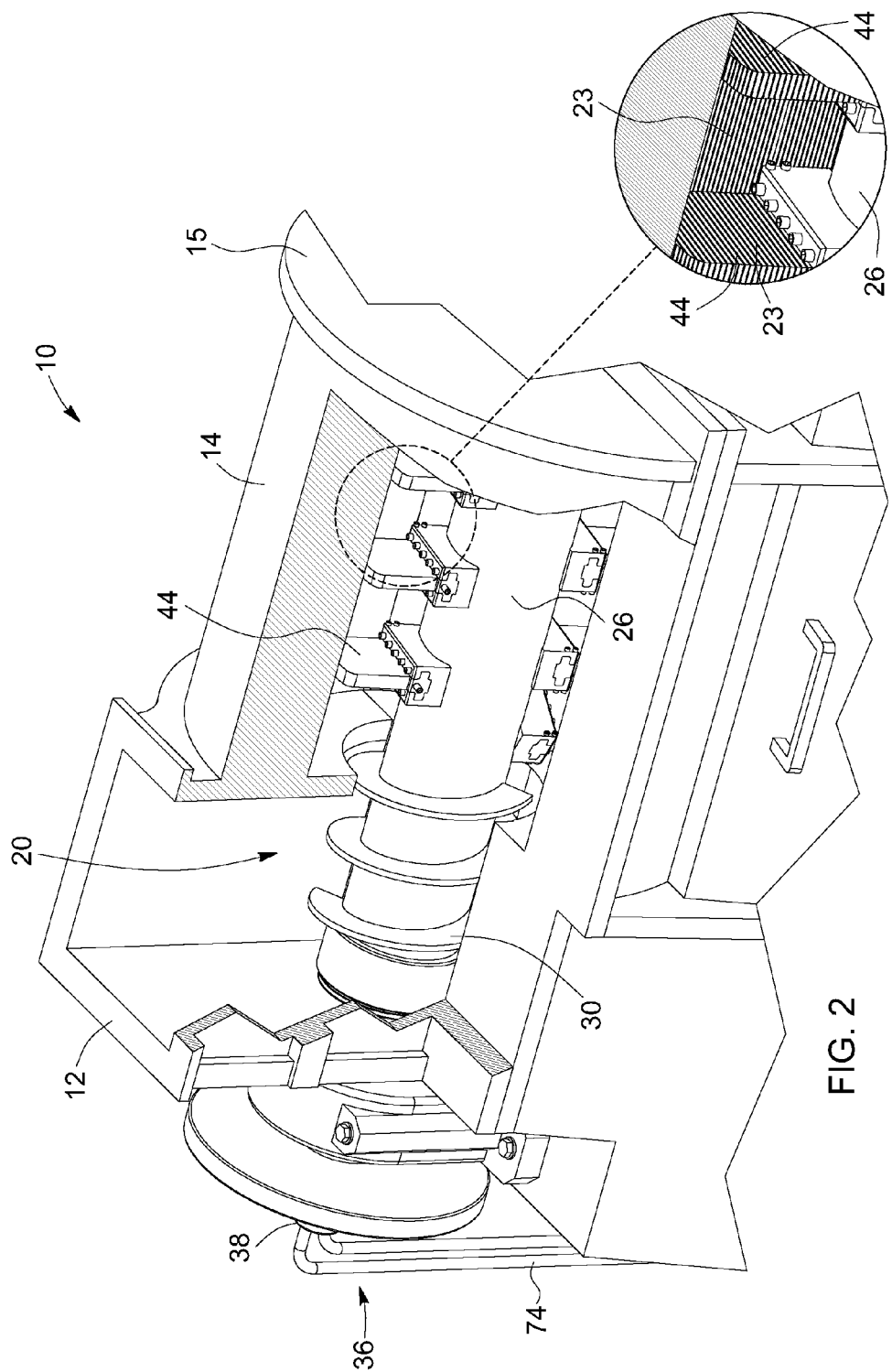
FIG. 2 is a cut-away view of a portion of the K-mixer, showing a shaft assembly, according to an embodiment of the invention.

FIG. 2 illustrates how the shaft assembly (20) is disposed in the K-mixer (10). The shaft assembly (20) is coaxial relative to the chamber (14) and has a portion extending in the chamber (14). The shaft assembly (20) includes a feed screw (30) operatively connected to an outer hollow shaft (26). The feed screw (30) is located in line with the hopper (12), and is for displacing the material toward the chamber (14). The portion of the shaft assembly (20) in the chamber (14) includes a plurality of blades (44) extending from the outer hollow shaft (26) in the stationary chamber (14), for treating the material. The blades (44) can also be referred to as "paddles". They allow mixing, shearing, beating and/or propelling the material within the chamber, for heating or cooling the material, when the shaft assembly (20) is rotating at high speed (up to 2000 rpm) or slower speeds to assist cooling.

The shaft assembly has a rotary joint end (36) connectable to an inner shaft. By "rotary joint" it is meant a joint which allows the rotation of the shaft assembly (20) relative to a fixed structure. In this particular embodiment, the rotary joint (38) also allows a fluid from a fluid source (74) to be circulated in and out of the shaft assembly (20). The fluid used is a heat transfer fluid, such as water, chemically treated water or vegetable oil. Of course, other types of heat transfer fluid can be used.

While in the present embodiment the hopper (12) and the feed screw (30) are located away from the motor, other embodiments of the K-mixer (10) can be considered, in which the hopper and feed screw (30) are located close to the motor, and the chamber (14) is located away from it. In an embodiment, and as shown in enlarged FIG. 2A, the inner surface of the chamber (14) is non-uniform, to create friction and shearing forces between the inner non-uniform surface (23) of the chamber (14) and the material being treated. The non-uniform surface can be obtained by applying hardfacing on the inner sidewall of the mixing chamber (14). In an embodiment, the lateral faces of the blades 44 are also provided with hard facing (23).

Figure 3:
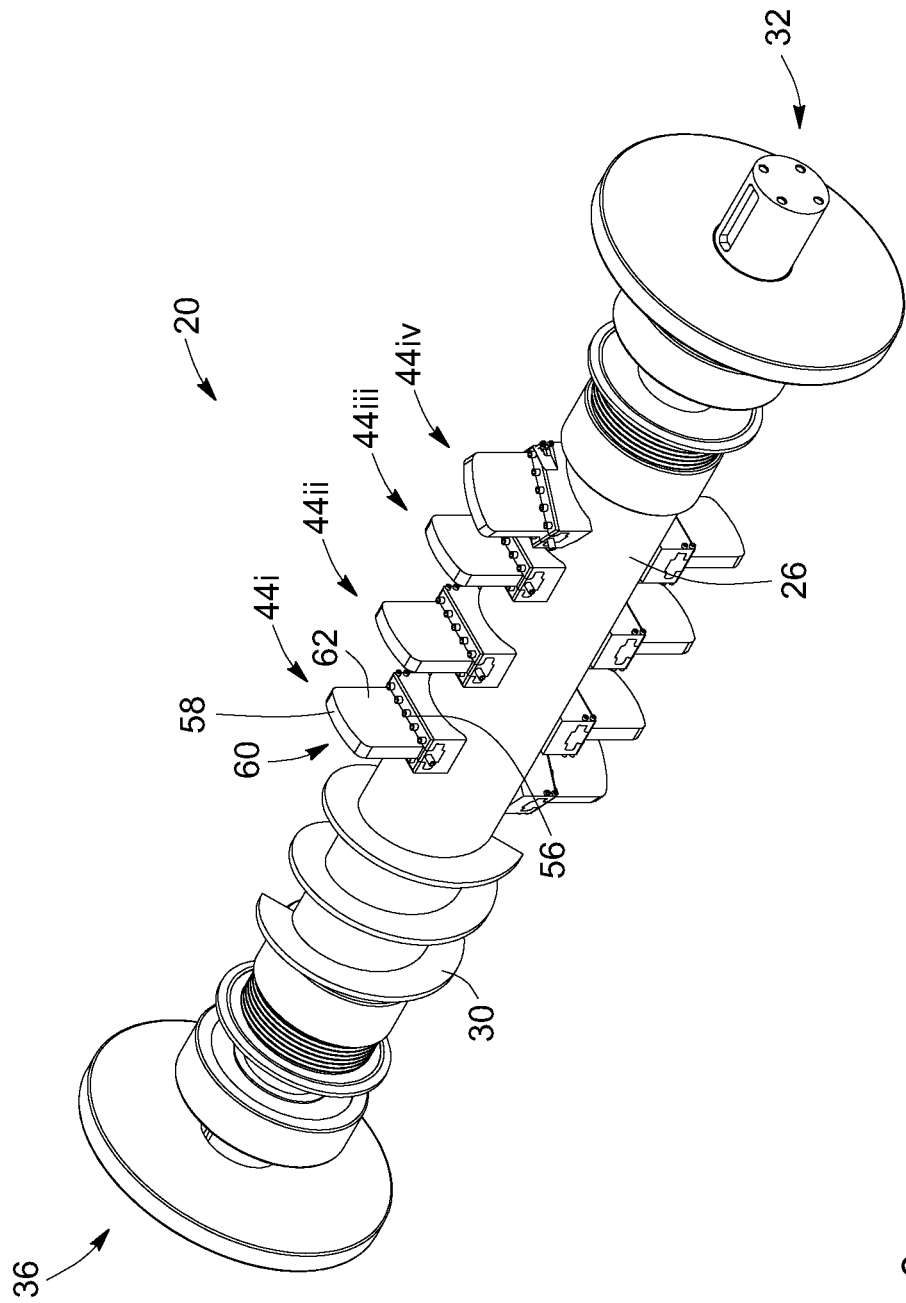
FIG. 3 is a perspective view of the shaft assembly of FIG. 2, according to an embodiment of the invention.
Figure 4:
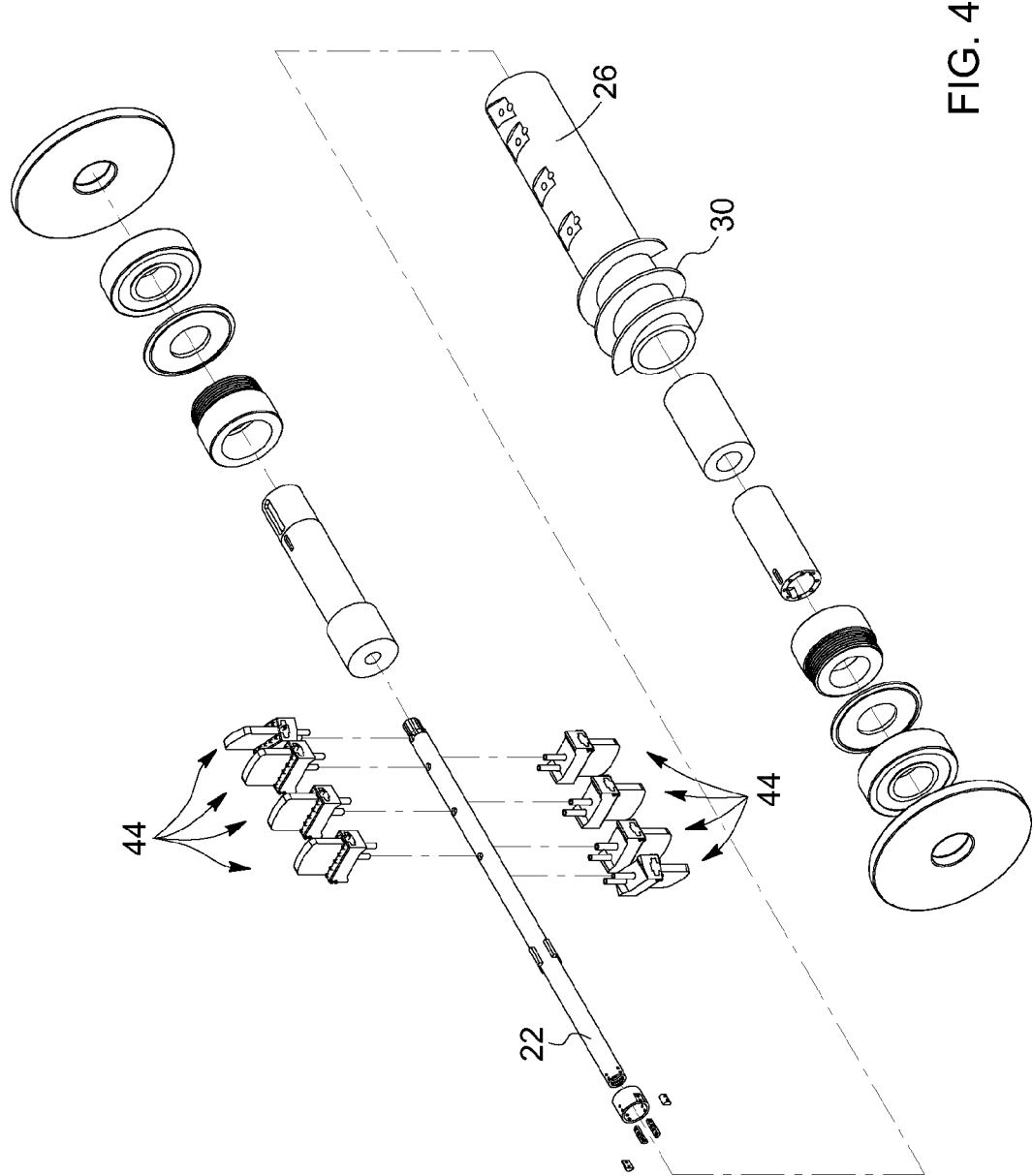
FIG. 4 is an exploded view of the shaft assembly of FIG. 3.

Referring to FIGS. 3 and 4, an embodiment of the shaft assembly (20) can be viewed in full, from the rotary joint end (36) to the motor end (32). The shaft assembly (20) includes the outer hollow shaft (26), and also an inner hollow shaft (22) (shown in FIG. 4). In this embodiment, each blade (44) has a substantially rectangular flat body (54), with a mounting end (56) operatively mounted to the outer hollow shaft (26), and an outer end (58) opposed to the mounting end (56). Of course, other geometries can be considered for the blades. The blades can be provided with a non-uniform surface, by applying hard facing for example, to increase friction and shearing between the blades and the material. The blades (44) have opposed first and second faces (60, 62), and they extend radially relative to the outer hollow shaft (26).

As best shown in FIG. 4, the blades (44) are removably attached to the outer hollow shaft (26), which allows replacing a blade, for example when its hard facing begins to wear. The modularity of the blades also allows changing the configuration of the blades on the shaft without having to change the entire shaft assembly. The blades (44) therefore include a mounting mechanism allowing to removably attaching the blade to the hollow shaft (26).

As best shown in FIG. 3, at least some of the blades are substantially parallel to a transverse cross-section the outer hollow shaft (26), such as the three leftmost blades (44$i$, 44$ii$, 44$iii$) located on the upper side of the shaft (26). Some of the blades can also extend at an angle relative to a radial direction from the outer hollow shaft (26), such as the rightmost blade (44$iv$) located on the upper side of the shaft (26), and the leftmost blade located on the lower side of the shaft (26). The blades extending at an angle relative to the radial direction of the shaft (26) can be located at the extremities of the shaft (26), acting as a scraper that guides the material from the sidewalls of the chamber towards the centre of the chamber. Of course, in other embodiments of the invention, all blades can be longitudinally twisted.

Figure 5:
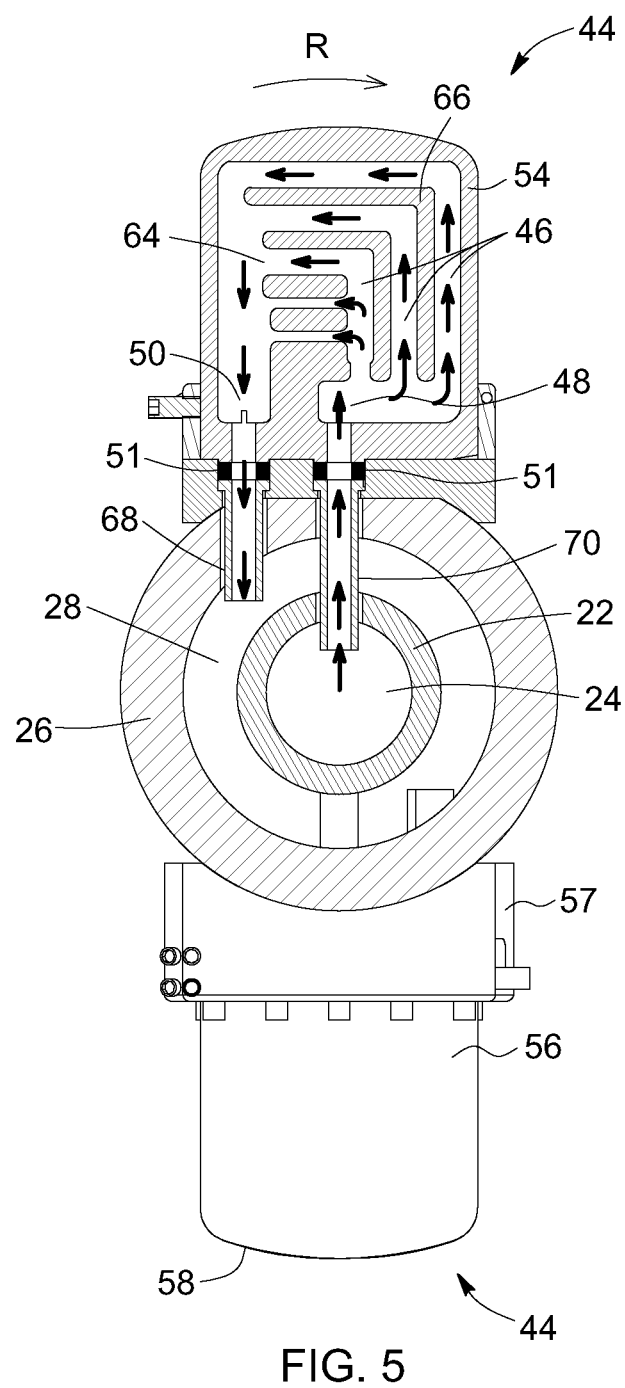
FIG. 5 is a transverse cross-section view taken alone lines V-V on FIG. 3.
Figure 6:
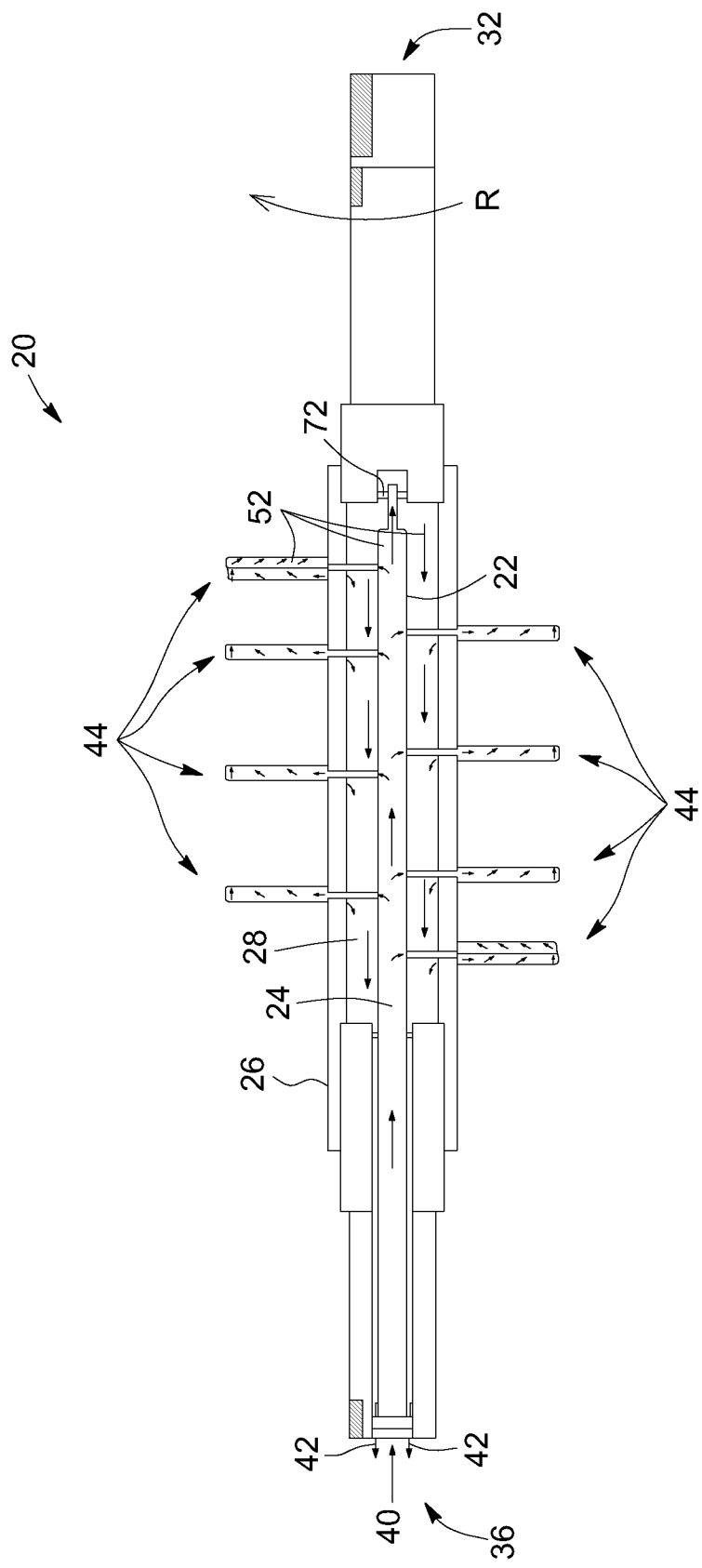
FIG. 6 is a schematic longitudinal cross-sectional view of a portion of a shaft assembly, according to an embodiment of the invention.

Referring to FIGS. 5 and 6, the continuous flow path (52) which allows a pressurized fluid to circulate within inner and outer hollow shafts (22, 26) and through the plurality of blades (44) will be described. The inner hollow shaft (22) defines an inner passage (24) which extends axially therein. The outer hollow shaft (26) coaxially surrounds the shaft (22) and is spaced away from it. The joint end (36) (shown in FIG. 6) has a fluid inlet (40) and a fluid outlet (42), each communicating with one of the inner and outer passages (24, 28). It can also be considered to provide the inner tube with insulation around it to resist heating by the return tube. Of course, the feed and return can be reversed, ie the feed of coolant can flow in the outer passage 28, and the return of coolant can flow in the inner passage 24.

As best shown in FIG. 5, the outer hollow shaft (26) forms an outer passage (28) with the inner hollow shaft (22), this outer passage (28) extending between the inner and outer hollow shafts (22, 26). The inner and outer passages (24, 28) are in fluid communication with each other, such as near the motor end. In an embodiment, although not necessarily, the cross-sectional area of the inner passage (24) substantially matches cross-sectional area of the outer passage (28). By approximately matching the feed and return cross-sectional areas the input (feed) pressure is roughly equivalent to the output (return) pressure, allowing circulating the fluid in a closed loop.

Still referring to FIG. 5, each blade (44) is provided with a network of channels provide a flow of fluid throughout the blade. The channels are configured to allow flow from the front edge to the back edge of the blade, taking advantage of the rotational inertia of the shaft assembly. The "front edge" and "back edge" being relative to the rotational direction of the shaft. Each of the blades can be provided with substantially concentric channels (46). By "substantially concentric", it is meant that the channels have a common center, or that they are coaxial, but it does not mean that they need to be configured as concentric circles. In the present embodiment, the channels (46) are disposed side-by-side, and have U-shape, but of course, other configurations can be considered. For each blade (44), a channel inlet (48) communicates with one of the passages (24, 28), and a channel outlet (50) communicating with the other one of the passages (28, 24). As can be appreciated, the channels 46 form a network of heating or cooling passages within the blade.

Referring now to both FIGS. 5 and 6, the inner passage (24), the channels (46) and the outer passage (28) form the continuous flow path (52), allowing a pressurized fluid to circulate within inner and outer hollow shafts (22, 26) and through the plurality of blades (44), from the fluid inlet (40) to the fluid outlet (42). The continuous flow path allows for controlling not only the temperature of the shafts (22, 26) but also the temperature of the blades (44). In addition, the concentric configuration of the channels (46) allow for the fluid to flow in an opposite direction of a rotational direction of the shaft assembly (20), taking advantage of the rotational inertia generated by the shaft when the mixer is in use. The flow of the fluid that enters the blade from the feeding passage can be adjusted either at the channel inlet (48) or within the blade (44). The feed pressure applied to the fluid (ex: 12 psi) and inertial effects of the blade rotation will assist with the circulation of the fluid from the input channel(s) to the output channel(s).

As best shown in FIG. 5, the blades are provided with flow adjustment devices, such as neoprene gaskets (51), provided between the paddle-shaped plate (54) and the connecting tubes (68,70), which can be made of metal. The gaskets (51) not only allow sealing the connection between the blade's body (54) and the tubes (68,70), they also allow controlling or adjusting the flow of fluid in the blade. This can be achieved by selecting the proper opening size (diameter) of the gasket. The size of the gasket opening can be selected to increase or decrease the flow of fluid in the blade relative to to the other blades. For example, if during operation of the K-mixer, one of the blades is running hotter than neighboring blades, the diameter of the gasket's opening for this blade can be increased, which will in turn increase the flow of fluid in the blade, allowing to lower its temperature. The opening size of the gaskets (15) can also be sized to control the flow of fluid within the blades (44), with different inlet and outlet sizes; for example with the inlet being greater than the outlet. Of course, there can be more than one inlet or outlet per blade.

With the present invention, the bent portions of the channels (46), and their configuration which forces the fluid to move in a direction opposite to the rotation of the shaft, allows taking advantage of the inertial effects, and advantageously improve heat transfer between the fluid and the material treated in the mixer. In other words, the channels are designed to «remove» as much heat as possible from the inertial mass of the metal.» The proposed design of channels generally guides the flow of fluid in the blades from the front side to the back side of the blade, the "front side" and "back side" of the blade being determined by the rotational direction of the assembly.

As shown in FIG. 5, at least one of the channels (46) of each blade (44) extends from the mounting end (56) to the outer end (58), providing heat transfer channels throughout an extended area of the blade (44). The cavity (64) in the blade (44), formed between its opposed faces, includes sidewalls (66) which delimits the channels (46). Some of the sidewalls have an I-shape, and some have an L-shape. The sidewalls together provide the channels (44) with a substantially inverted U-shape. As can be appreciated, the channels (46) are sized and shaped to promote continuous fluid flow within the blades, which in turn improves heat transfer and allow controlling the temperature of the blades. In the context of rubber regeneration, controlling of the blade temperatures for initial and repeated cycles ensures process consistency and the regenerated rubber (RR) product quality. Injection of the coolant, typically water, and reduction of revolution per minute of (RPM) the shaft is also used to cool the regenerated rubber.

Each blade 44 has a pair of connecting tubes (68, 70) extending radially relative to the hollow shafts (22, 26). The connecting tubes (68, 70) are connected to respective gaskets (51) which in turn are connected to the channel inlet (48) and the channel outlet (50). The connecting tubes (68, 70) are also connected to the inner and outer passages (24, 28), respectively. The inner and outer hollow shafts (22, 26) (feed shaft and return) are equipped with perforations to accommodate connecting tubes of the blades. The connected tubes 68, 70 can be threaded in the hollow shafts (22,26) but of course other types of connections can be considered.

In the present case, and as best shown in FIG. 6, the fluid inlet (40) is connected to the inner passage (24) and the fluid outlet (42) is connected to the outer passage (28). The fluid is thus fed from the fluid inlet (40), then through the inner passage (24) first, passing through the return flow adjustment (72) (which is optional). The fluid then passes in each of the blades 44, and returns to the outlet (42) through the outer passage (28). For each blade (44), the channel inlet (48) communicates with the inner passage (24) and the channel outlet (50) communicates with the outer passage (28). Of course, in other embodiments, it can be considered to have the fluid first flow in the outer passage (28), and return to the outlet from the inner passage. In this case, the channel inlet (48) of the blades would communicate with the outer passage (28) and the channel outlet (50) would be linked to the inner passage (24).

Still referring to FIG. 6, the return flow adjustment mechanism (72) is optional and can be disposed between the inner and outer passages (24, 28), for controlling the flow of fluid between the inner and the outer passages (24, 28). At the joint end (36) the fluid inlet (40) and the fluid outlet (42) each communicates with a respective one of the inner and outer passages (24, 28).

The K-mixer described therein is especially adapted for the regeneration of crumb rubber, which requires in some applications heating the crumbs at a temperature up to about 225 degrees Celsius, in about 50 seconds, and then cooling it to about 120 degrees Celsius, in about 40 seconds. In an embodiment, the crumbs must not be heated over 230 to 250 degrees Celsius. In order to be able to operate the K-mixer semi-continuously, which means without interruption (or very little delay ex: 2 to 10 sec) from one batch to the other, the blades and the devulcanized rubber must be cooled rapidly once the devulcanization has occurred, and thus the fluid used is a cooling fluid. The continuous flow path extending in both the shafts and blades of the shaft assembly (20) allows not only to control/limit the temperature increase in the chamber when the devulcanization is reached, but also to decrease the time required to cool down the regenerated crumb rubber, which in turn improves the production yields of the regeneration process. Of course, the temperature of the mixing chamber is also controlled by water jackets surrounding it. In an embodiment, the RPM of the shaft assembly is controlled based upon the cooled state of the blades. Cooling can be only circulated in the shaft and blades when maximum temperature is reached and the water is injected into the chamber, after which the cooling phase begins. By "continuous" flow path, it is meant that the passages in the hollow shafts and the channels in the blades are in fluid communication. The flow of fluid in the path can run continuously, or flow intermittently, according to the specific requirements of the process. Of course, for other applications, it can be considered to use a heating fluid instead of a cooling fluid. The fluid can be heated or cooled using external or internal devices, such as for instance an electric coil or a chiller.

In order to adapt the flow of fluid in the shafts and in the blades in function of the need of the K mixer application, a temperature sensor, preferably an infrared (IR) sensor, such as the LuminSense™, can be located at the bottom of the chamber, at approximately 0.010" below the inner surface, to measure crumb rubber temperature and possibly the blade temperatures. Additionally, an IR temperature sensor such as sensor 76 identified in FIG. 1, can be used to sense the temperature of at least one and preferably of all the blades. Another option for measuring the temperature of each blade is by using a hand held IR thermometer at the start and end of a cycle.

Figures 7, 7A:
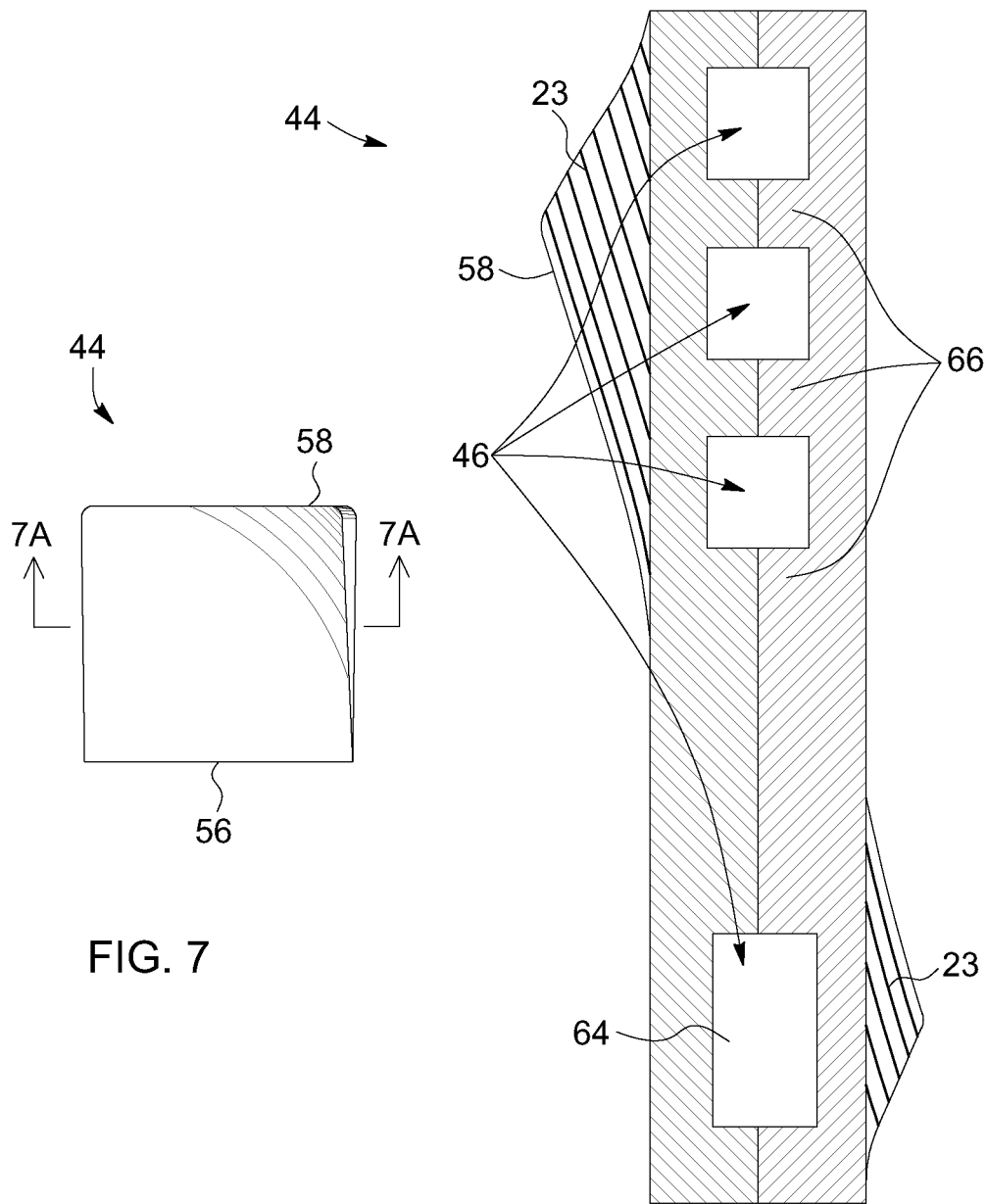
FIG. 7 is a front view of a twisted blade, according to an embodiment.
FIG. 7A is a cross section view taken along lines A-A of FIG. 7, showing the outlines of the seal welding locations forming the channels inside the blades.

As best shown in FIGS. 7 and 7A, the blades (44) can have a shape which is twisted longitudinally, for improving the propelling of the material. In this particular case the blade has a rectangular shape, but other shapes can be considered. Also, still with the goal of increasing friction and shear between the blades and the material, the outer surfaces (60, 62) of the blades can be non-uniform, by applying a hard facing (23). In this example the channels (46) are machined in symmetric pieces of metal. The top piece has additional channels cut through the entire thickness. The flat pieces are then "seal" welded together.

Figure 8:
FIG. 8 is a front view of a blade, according to another embodiment.
Figure 8A:
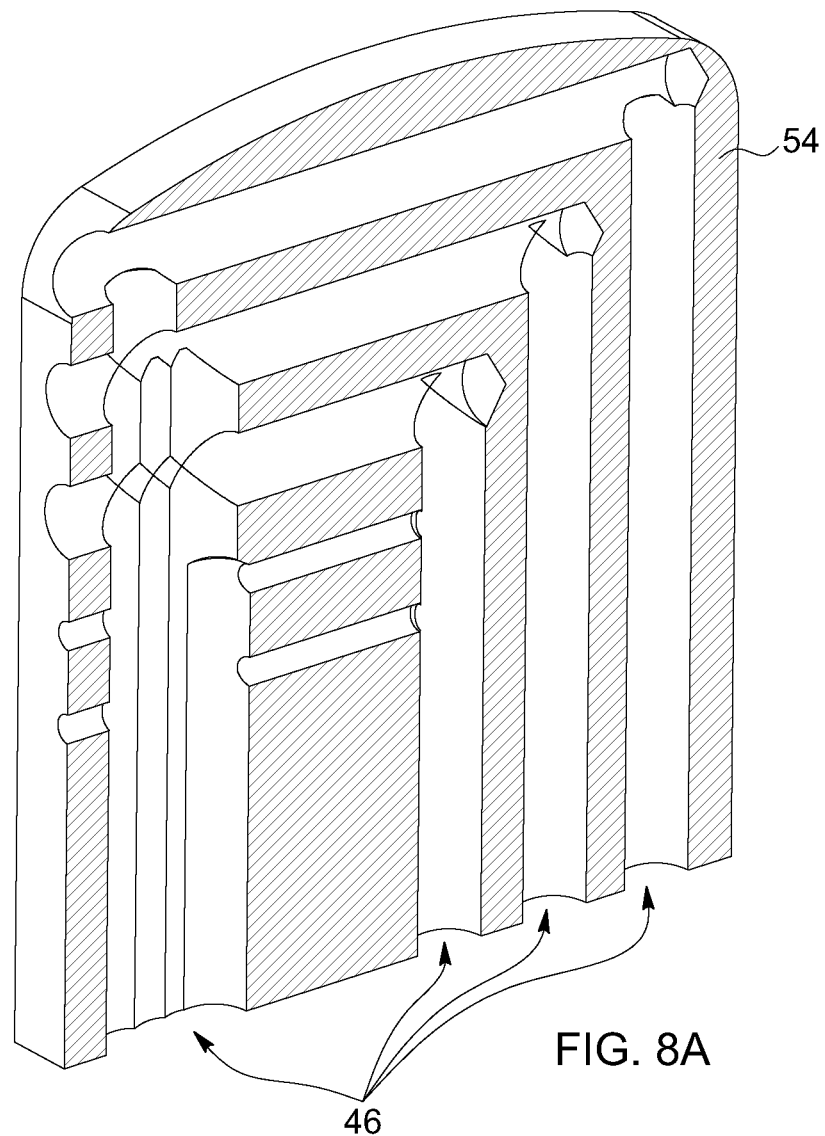
FIG. 8A is a cross section view taken along lines A-A of FIG. 8, showing machined channels made in a single metal plate blade.

Referring now to FIGS. 8 and 8A, another possible embodiment of a blade is shown. In this case the channels are machined in a solid metallic plate. Welded plugs are provided on the side of the blade to close off the channels on the side of the blade, allowing the fluid to circulate from the front to the back edge. As can be appreciated, this variant of the blade is provided with several inputs and outputs.

Experimental Results

Trials were conducted in order to demonstrate the advantages and benefits of using the improved shaft assembly described above, in which both the shaft and the blades are cooled, compared to a shaft assembly in which only the shaft is cooled. The trials were conducted in the context of regenerating vulcanized crumb rubber. All trials were performed with a LumaSense Photrix™ Infra Red (IR) temperature sensor operating over the span of 65° C. to 950° C. (model number ML-GAPX-LO-M3-MP2-05) to measure the regenerated rubber (RR) temperature. Blade and shaft temperatures were measured with an infra-red hand held thermometer (either at the start or at the end of a cycle).

Shaft vs. Shaft/Blade Cooling

In a first trial, only the shaft of the K-mixer was cooled during the regeneration cycle of the crumb rubber. In other words, a coolant was circulated solely in the inner and outer hollow shafts of the K-mixer during the cooling phase of the processing. The temperatures for each of the eight (8) blades over 5 consecutive trials were recorded at the end of each cycle followed by a 15 minute cool down period three times to obtain data for 15 trials.

In a second trial, the shaft and all eight blades were cooled, with a continuous flow of coolant circulating in the blades and in the inner and outer hollow shafts during the cooling period which coincides with the injection of the water into the chamber the instant the max temperature set point of the crumb rubber has been achieved. The respective temperatures of the eight blades were recorded, for 15 consecutive trials.

Table 1 summarized the temperature control achieved when the shaft only was cooled compared to when both the shaft and the blades were cooled. Introducing cooling to the blades significantly ($\alpha$=0.05) reduced the blade temperature by 38° C. (or 29.5%) from 129° C. to 91° C. assuring that the system can be operated semi-continuously with consistent process performance and therefore product quality.

TABLE 1

Average temperatures of 8 blades over 15 trials.

| Type of Cooling | | Temp. Avg (° C.) |
|---|---|---|
| Shaft only | | 129 |
| Shaft and blades | | 91 |
| Difference | (° C.) | 38 |
| | (%) | 29.5% |

Figure 9:
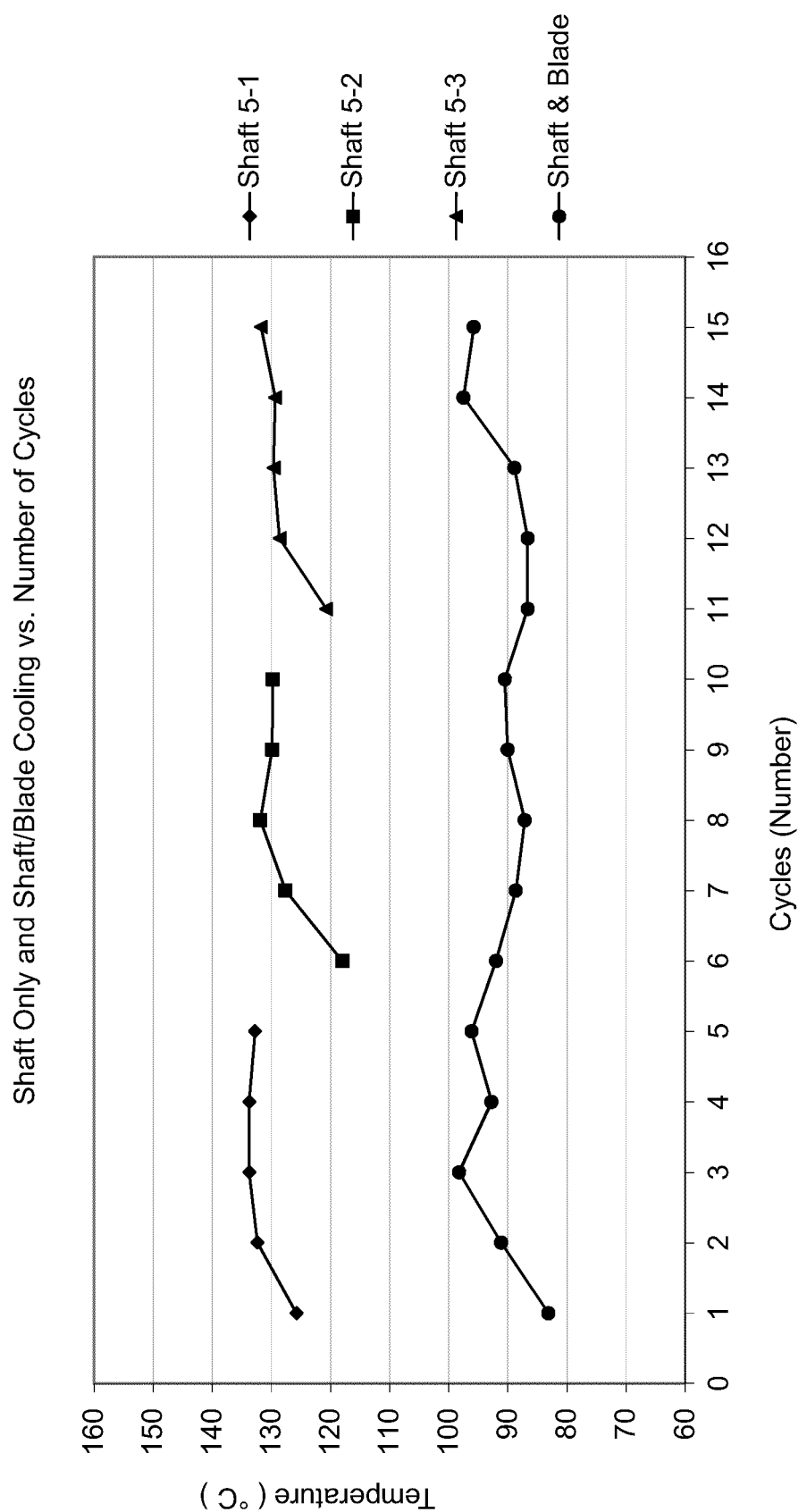
FIG. 9 is a graph of the average temperature measured on the 8 blades of the shaft, when only the shaft was cooled for 3 different sets of 5 trials (curves "Shaft 5-1", "Shaft 5-2" and "Shaft 5-3"), and of the average temperature measured from the 8 blades of the shaft (curve "ShaftBlade"), when the shaft and all 8 blades were cooled, as a function of the number of cycles for which the K-mixer was operated.

Referring to FIG. 9, this graph shows the recorded average of the respective temperatures of the eight blades over 15 consecutive trials with cooling applied to the shaft only (top three curves Shaft 5-1, 5-2 and 5-3) and with cooling applied to the shaft and the blades. When running the shaft cooling only trials, a pause was required of 15 minutes otherwise blade temperatures continued to increase. The discontinuities between the three top curves correspond to the pauses. The average of the temperatures measured on the eight blades when only the shaft was cooled was 129° C. while it was 91° C. when the shaft and blades were cooled (38° C. or 29.5% cooler).

Blade Temperature by Position

In this experiment, five trials were conducted for which the temperature of each of the eight blades was recorded, by position, with the shaft only being cooled, and with the shaft and blades being cooled. The recorded temperatures for each blade were averaged and the results are listed in the table below.

TABLE 2

Average temperatures of the 8 blade positions over 5 trials.

| Blade (Position) | Cooling | |
|---|---|---|
| | Shaft (° C.) | ShaftBlade (° C.) |
| 1 | 135.6 | 90.8 |
| 2 | 125.4 | 88.6 |
| 3 | 127.4 | 87.8 |
| 4 | 134.8 | 92.2 |
| 5 | 128.2 | 92.2 |
| 6 | 128.6 | 96.4 |
| 7 | 121.6 | 94.4 |
| 8 | 151.8 | 95.8 |
| Avg | 131.7 | 92.3 |
| SD | 9.3 | 3.2 |
| COV | 0.071 | 0.034 |
| COV % | 7.1% | 3.4% |
| Diff % | | 52% |

Figure 10A:
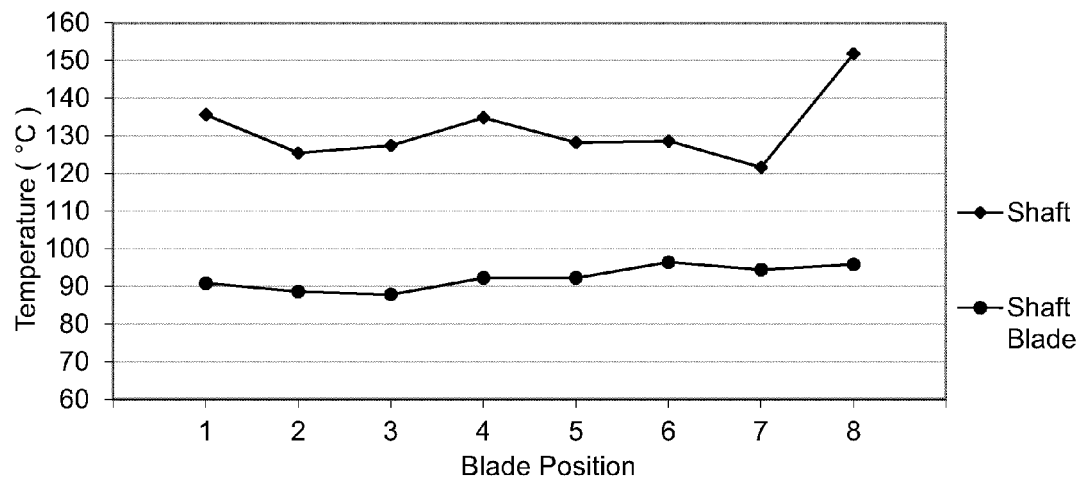
FIG. 10A is a graph of the average of the temperature measured on each blade of the shaft during 5 trials, when only the shaft was cooled (upper curve "Shaft") and of the average of the temperature of each blade, when both the shaft and the blades were cooled (curve "ShaftBlade"), as a function of the position of the blade on the shaft.
Figure 10B:
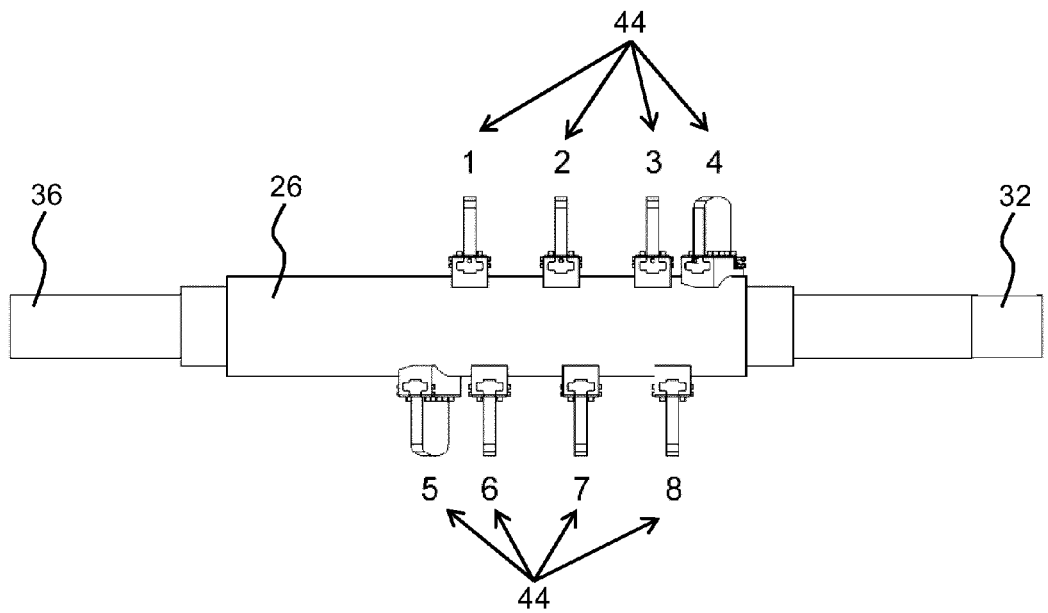
FIG. 10B is a side view of the shaft assembly, indicating the position of each blade on the shaft, as used in the graph of FIG. 10A.

Referring to FIG. 10A, the curves correspond to the recorded average temperature for each of the eight blades over 5 trials with cooling applied to the shaft only and to the shaft and blades. Shaft cooling only average was 132° C. ($\sigma$=9.3) while the shaft and blade had an average of 92° C. ($\sigma$=3.2) which was significantly reduced ($\alpha$=0.05) by 40° C. (or 30%) cooler. Furthermore, when both the shaft and the blades were cooled, the variation between the blades was appreciably reduced with standard deviations that decreased from 9.3 to 3.2° C. while the corresponding coefficient of variation (COV=$\sigma/\bar{x}$) decreased from 0.071 to 0.034 (reduced by 0.037 or 52%). This consistency in temperature allows for proper system control and improved product quality since blade temperatures were significantly reduced on average and the variation in temperature between blades were noticeably reduced. FIG. 10B indicates the position of each blade.

As can be appreciated, the added blade cooling significantly reduced the temperature for each blade on average (see Table 2). Furthermore, the variation between blades was appreciably reduced.

RPM and Temperature vs. Time Curves for Shaft Only and Shaft and Blade Cooling

Figure 11A:
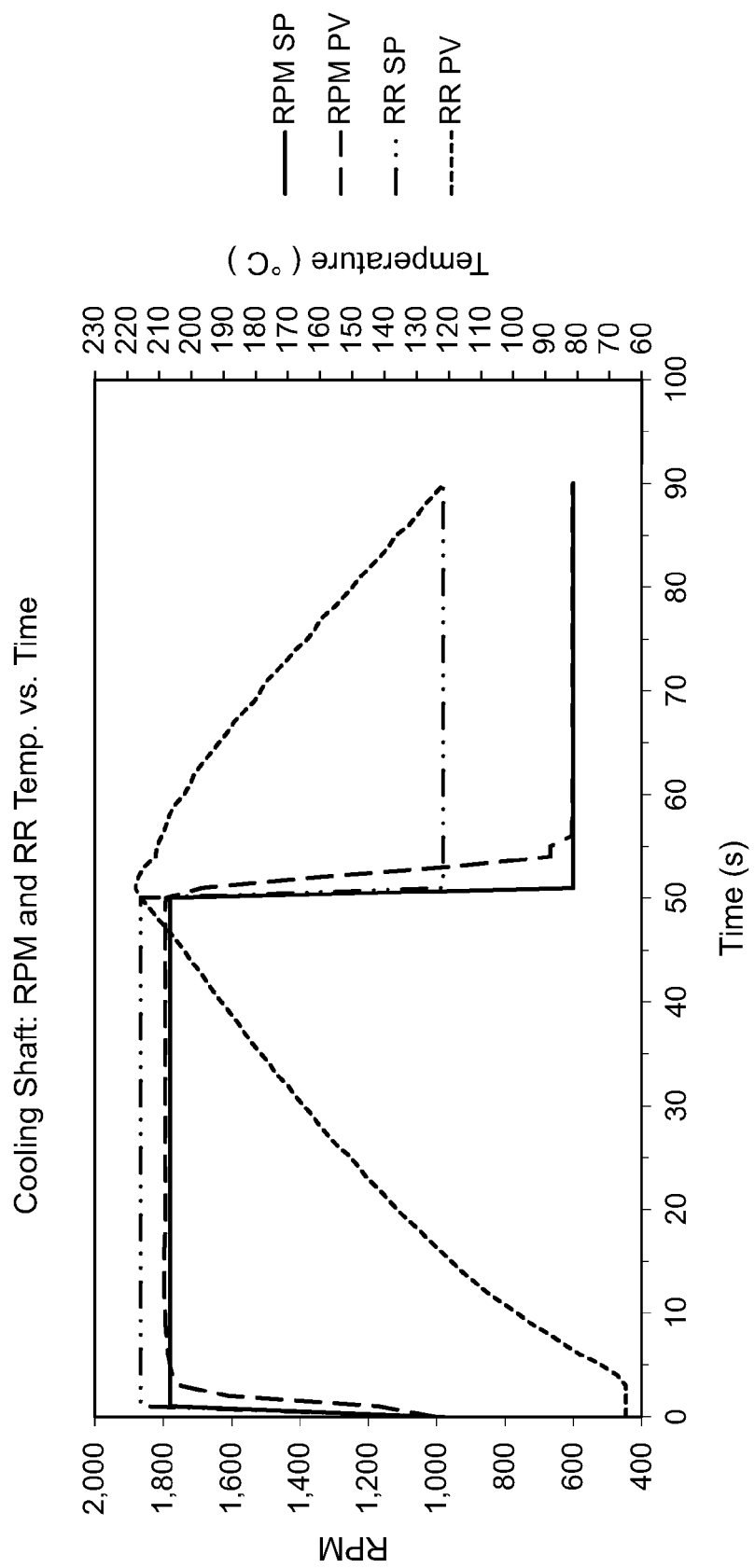
FIG. 11A is a graph of including four curves resulting from a crumb rubber regeneration cycle, with only the shaft of the K-mixer being cooled, and with a shaft RPM (Revolution Per Minute) set at 1780 during the heating step. Two of the curves illustrate the RPM (Y axis on the left side of the graph), one curve corresponding to the set point RPM, and the other corresponding to the process value RPM, as a function of time. The two other curves illustrate the set point and process value temperature of the crumb rubber being mixed in the mixing chamber (Y-axis on the right-side of the graph), as a function of time.
Figure 11B:
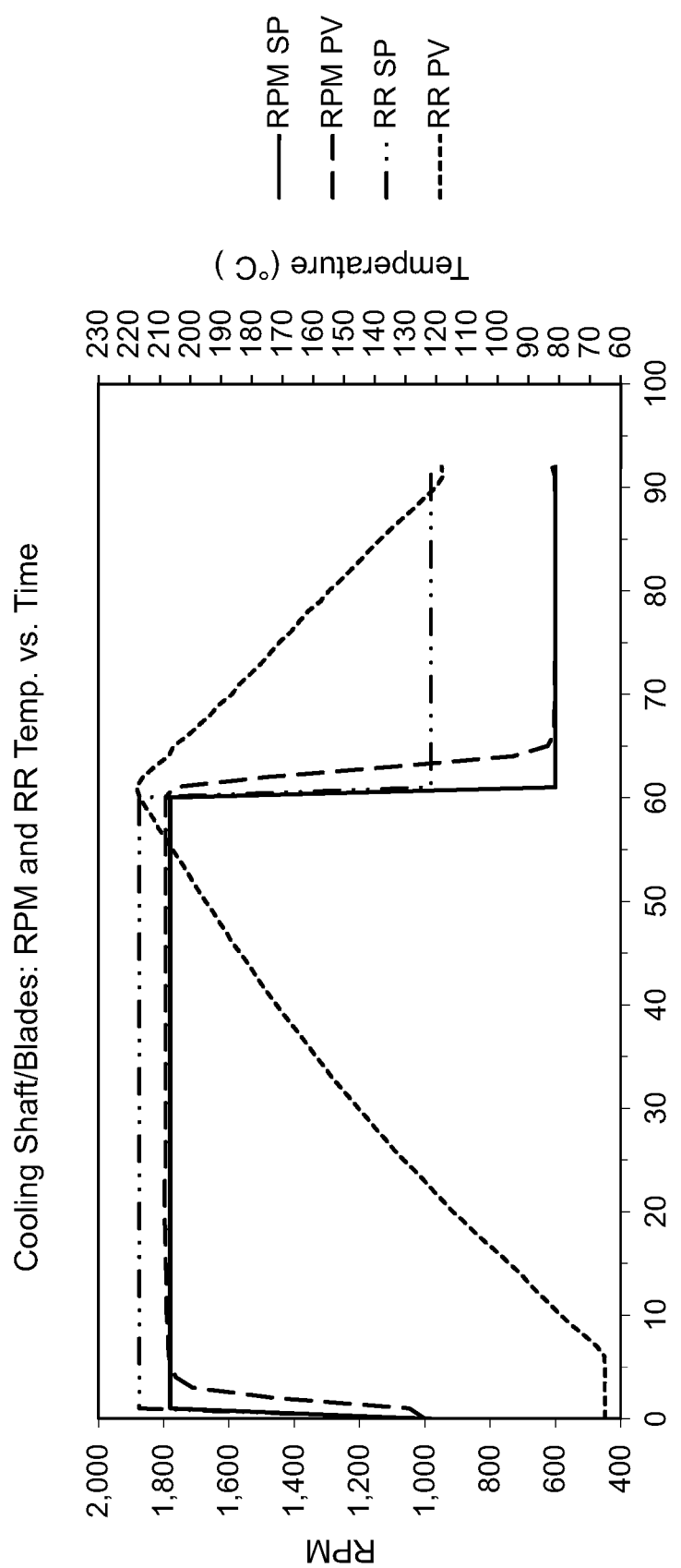
FIG. 11B is a graph of including four curves resulting from a crumb rubber regeneration cycle, with the shaft and blades of the K-mixer being cooled, and with a shaft RPM (Revolution per minute) set at 1780 during the heating step. Two of the curves illustrate the RPM (Y axis on the left side of the graph), one curve corresponding to the set point RPM, and the other corresponding to the process value RPM, as a function of time. The two other curves illustrate the set point and process value of the temperature of the crumb rubber being mixed in the mixing chamber (Y-axis on the right-side of the graph), as a function of time.
Figure 11C:
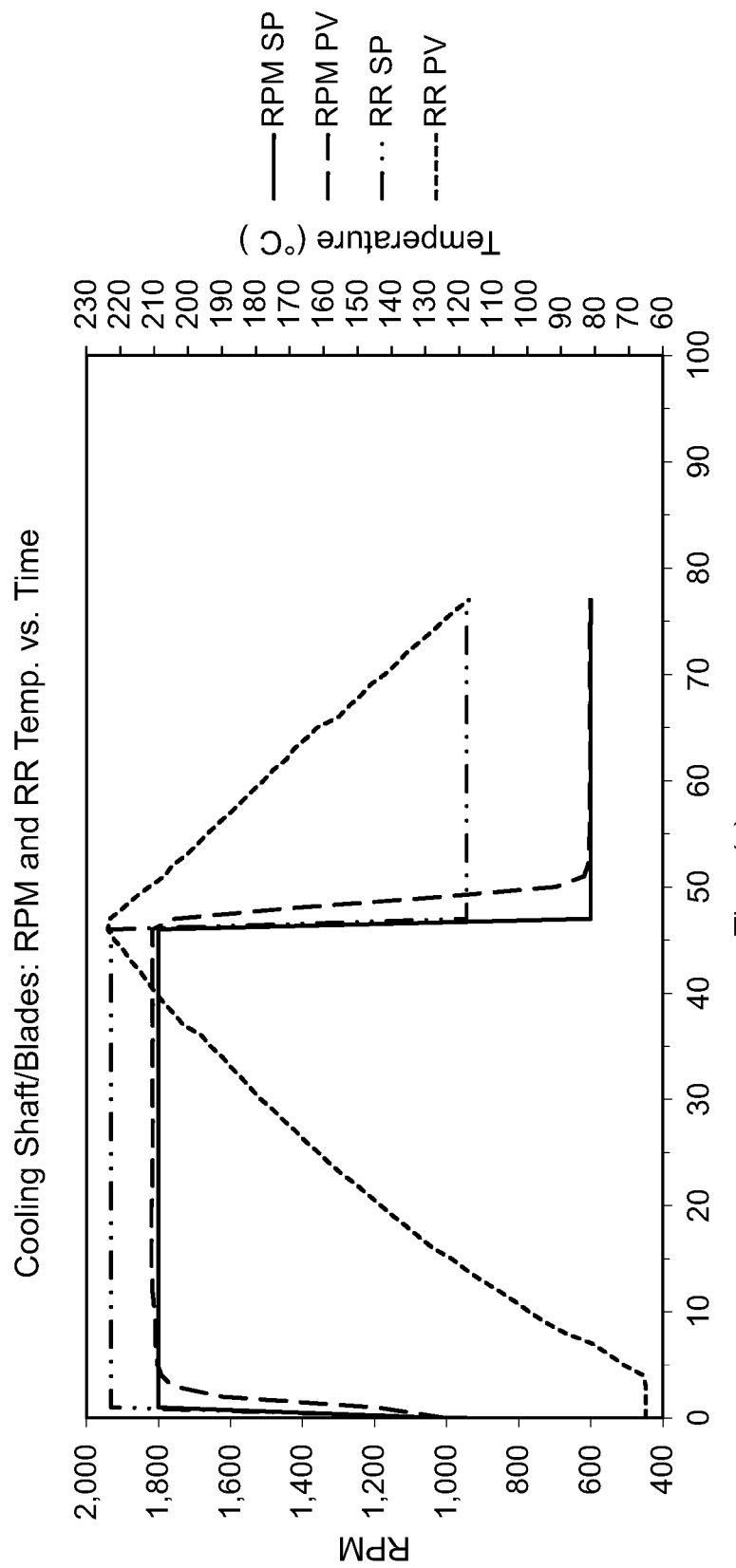
FIG. 11C is a graph of including four curves resulting from a crumb rubber regeneration cycle, with the shaft and blades the K-mixer being cooled, and with a shaft RPM (Revolution per minute) set at 1800 during the heating step. Two of the curves illustrate the RPM (Y axis on the left side of the graph), one curve corresponding to the set point RPM, and the other corresponding to the process value RPM, as a function of time. The two other curves illustrate the set point and process value of the temperature of the crumb rubber being mixed in the mixing chamber (Y-axis on the right-side of the graph), as a function of time.

Referring now to FIGS. 11A to 11C, the graphs provide a comparison of the rubber regenerated process, 1) using a shaft assembly for which only the shafts are cooled (FIG. 11A), and 2) using a shaft assembly for which the shafts and the blades are cooled (FIGS. 11B and 11C). RPM SP corresponds to the RPM Set Point (target RPM) of the shaft while RPM PV refers to the actual RPM Process Value (actual RPM obtained). Similarly, the RR SP refers to the desired Regenerated Rubber Set Point temperature of the crumb rubber being mixed, while RR PV is the Regenerated Rubber Process Value (actual measured temperature).

The table below summarizes the key values presented in the graphs:

TABLE 3 key values for graphs 11A to 11C.

| | | | RPM SP | | | RR SP | | Heat | | Cool | | Total |
|---|---|---|---|---|---|---|---|---|---|---|---|---|
| | | | Start | Max | Cool | Max | Exit | | | | | |
| Cooling | Trial | | (C.) | (C.) | (C.) | (C.) | (C.) | (s) | (%) | (s) | (%) | (s) |
| Shaft | 1435-001 | A | 1,000 | 1,780 | 600 | 216 | 121.8 | 50 | 56% | 40 | 44% | 90 |
| Shaft/Blades | 1473-001 | B | 1,000 | 1,780 | 600 | 217 | 121.8 | 61 | 66% | 31 | 34% | 92 |
| Shaft/Baldes | 1565-003 | C | 1,000 | 1,800 | 600 | 223 | 117.8 | 46 | 60% | 31 | 40% | 77 |

As can be appreciated, the shaft and blade cooling allows for consistent and reduced processing temperature profiles which improves productivity while maintaining Regenerated Rubber (RR) product quality.

Typical RPM and Temperature vs. time curves for a shaft only cooling conditions are presented in FIG. 11A. The processing time is approximately 90 s with about 56% (or 50 s) of the time responsible for heating (the rise portion of the curve) and approximately 44% (or 40 s) of the time associated with the cooling of the RR (downward slope of the curve).

Referring to FIG. 11B, maintaining operating parameters with the shaft and the blades being cooled increased the heating portion of the curve from 50 to 61 s (or 66% of total cycle time) while the cooling portion of the curve decreased to 31 s (or 34% of total cycle time) for a final cycle time total of 92 s, which was slightly longer than the trial in FIG. 11A. Clearly the cooling of the blades has had the effect of noticeably reducing the cooling phase of the curve and furthermore the heating portion of the curve can be reduced by increasing the RPM's since the blades are cooler.

In FIG. 11C, the RPM's were increased from 1,780 to 1,800 reducing the total cycle time from 90 s in FIG. 11A to 77 s (reduced by 13 s or 14.4%). The heating portion of the curve decreased from 50 s to 46 s (4 s) while the duration of the cooling portion of the curve decreased from 40 s to 31 s (9 s). The reduction in cycle time was achieved in spite of a higher set point temperature and lower exit temperature which increases processing time.

The curve in FIG. 11C is representative of the process configuration currently being implemented. Total cycle times can be compressed further. For example, increasing the RPM's will decrease the heating time portion of the cycle. Furthermore, increasing the RPM's and reducing the coolant temperature with a suitable chiller will reduce the overall cycle time as well.

As can be appreciated, the cooling time required to decrease the temperature from about 220° C. to about 120° C. is reduced from 40 seconds to about 30 seconds.

The results presented in the graph of FIGS. 11A to 11C were obtained using the following method. Vulcanized crumb rubber and a lubricant, such as oil, were introduced in a first mixer, the lubricant being at room temperature. The crumb rubber and the lubricant were mixed at room temperature, for a predetermined period of time, to form a substantially homogenous mixture. This mixture was then transferred into a K-mixer, as described above.

The RPM of the shaft assembly was raised to increase the temperature of the mixture during a first period of time until a devulcanizing temperature is reached. The devulcanizing temperature can be for example 225° C. and is reached within a time period of 25 and 60 seconds, and in some embodiments about 40-45 seconds. The RPM of the shaft assembly is raised between 1700 and 2000, such as to about 1750-1850 rpm. The temperature was then reduced to a lower temperature during a second period of time. For example, the crumb rubber can be cooled from about 225 to about 120 degrees in about 40 seconds, when only the shaft was cooled, and in some embodiments about 30 seconds, which was possible when the shaft and blades were cooled.

During the cooling period, the set point RPM of the shaft was reduced between 400 and 700 rpm, and in some embodiments, to about 600 rpm. The mixing chamber was cooled with a cooling jacket surrounding the mixing chamber, and with a spray nozzle injecting a stream or mist of cooling agent, such as water, in the mixing chamber. Finally, the motor was stopped and the regenerated crumb rubber was recovered from the mixing chamber.

The scope of the invention should not be limited by the embodiments set forth in the examples, but should be given the broadest interpretation consistent with the description as a whole.

The invention claimed is:

1. A temperature-controlled K-mixer for thermally and kinetically treating a material, the K-mixer comprising:
   a substantially cylindrical stationary chamber for containing the material, the chamber having a chamber inlet for receiving the material and a chamber outlet for discharging the material;
   a shaft assembly coaxial with the chamber and having a portion extending in the stationary chamber, the shaft assembly comprising:
      an inner hollow shaft defining an inner passage extending therein;
      an outer hollow shaft coaxially surrounding and spaced away from the inner hollow shaft, the outer hollow shaft forming an outer passage with the inner hollow shaft, the outer passage extending between the inner and outer hollow shafts, the inner and outer passages being in fluid communication with each other;

a motor end connectable to a motor for rotating the shaft assembly;

a joint end connectable to a rotary joint, the joint end having a fluid inlet and a fluid outlet, each communicating with a respective one of the inner and outer passages; and a plurality of blades extending from the outer hollow shaft in the stationary chamber, for mixing the material, the blades being respectively formed from at least one solid plate having walls defining a thickness provided with a plurality of channels extending therein, the channels being formed at least partially within the thickness of said at least one plate, each blade comprising a channel inlet communicating with one of the passages, and a channel outlet communicating with the other one of the passages;

wherein the K-mixer is adapted for operating at speeds greater than 400 RPM and wherein the inner passage, the channels and the outer passage form a continuous flow path allowing a pressurized fluid to circulate within inner and outer hollow shafts and through the plurality of blades, from the fluid inlet to the fluid outlet, for controlling a temperature of the shafts and a temperature of the blades, allowing a flow of the fluid in the blades in an opposite direction of a rotational direction of the shaft assembly.

2. The temperature-controlled K-mixer according to claim 1, wherein each of the blades has a body with a mounting end operatively mounted to the outer hollow shaft, and an outer end opposed to the mounting end, at least some of the channels of each blade extending from the mounting end to the outer end.

3. The temperature-controlled K-mixer according to claim 1, wherein for each of the blades, the channels are shaped and configured as U-shaped channels.

4. The temperature-controlled K-mixer according to claim 3, wherein the walls comprise:

opposed first and second lateral and substantially planar faces which are also substantially parallel to a transverse cross-section of the hollow shafts; and a plurality of channel sidewalls extending between the walls, part of said at least one plate, delimiting the channels.

5. The temperature-controlled K-mixer according to claim 4, wherein at least one of the sidewalls has an I-shape or an L-shape.

6. The temperature-controlled K-mixer according to claim 2, wherein each of the blades comprises a mounting mechanism including a mounting plate affixed to the hollow shaft, the mounting plate being provided with a groove receiving the mounting end of the blade for removably connecting the blade to the outer hollow shaft, for allowing replacement of the blade.

7. The temperature-controlled K-mixer according to claim 1, comprising pairs of connecting tubes associated with the respective blades, the tubes being distinct from the plates forming the blades, the connecting tubes extending radially relative to the hollow shafts, the connecting tubes connecting the channel inlets and the channel outlets to one of the inner and outer passages, respectively.

8. The temperature-controlled K-mixer according to claim 7, wherein each of the blades is provided with a flow adjustment device sized to individually control the flow of fluid within each blade.

9. The temperature-controlled K-mixer according to claim 1, wherein the fluid inlet is connected to the inner passage and the fluid outlet is connected to the outer passage, the fluid being fed through the inner passage and returning to the outlet through the outer passage.

10. The temperature-controlled K-mixer according to claim 9, wherein for each of the blades, the channel inlet communicates with the inner passage and the channel outlet communicates with the outer passage.

11. The temperature-controlled K-mixer according to claim 1, wherein the fluid inlet is connected to the outer passage and the fluid outlet is connected to the inner passage, the fluid being fed through the outer passage and returning to the fluid outlet through the inner passage.

12. The temperature-controlled K-mixer according to claim 11, wherein for each of the blades, the channel inlet communicates with the outer passage and the channel outlet communicates with the inner passage.

13. The temperature-controlled K-mixer according to claim 1, comprising a return flow adjustment mechanism disposed between the inner and outer passages, for controlling flow of the fluid between the inner and the outer passages and an exit flow of the blades.

14. The temperature-controlled K-mixer according to any one of claim 1, wherein at least one of the blades extends radially relative to the outer hollow shaft.

15. The temperature-controlled K-mixer according claim 1, wherein at least one of the blades extends at an angle relative to a radial direction from the outer hollow shaft.

16. The temperature-controlled K-mixer according to claim 15, wherein said chamber comprises opposed end sidewalls, and wherein said at least one of the blades comprises two blades respectively positioned close to said sidewalls, acting as scrapers to push the material toward a center of mixing chamber, away from the sidewalls.

17. The temperature-controlled K-mixer according to claim 1, wherein cross-sectional area of the inner passage substantially matches cross-sectional area of the outer passage.

18. The temperature-controlled K-mixer according to claim 1, wherein of the channels are sized and shaped to promote fluid flow within the blades.

19. The temperature-controlled K-mixer according to claim 1, comprising a fluid source for providing the fluid with the continuous flow path.

20. The temperature-controlled K-mixer according to claim 19, wherein the fluid source is a source of cooling fluid.

21. The temperature-controlled K-mixer according to claim 19, wherein the fluid source is a source of heating fluid.

22. The temperature-controlled K-mixer according to claim 1, wherein the outer surfaces of the blades are non-uniform.

23. The temperature-controlled K-mixer according to claim 1, wherein at least one of the blades is twisted longitudinally.

24. The temperature-controlled K-mixer according claim 1, comprising at least one temperature sensor for sensing the temperature of the material in the chamber, wherein coolant in the blades circulates based on the temperature of the material.

25. The temperature-controlled K-mixer according claim 1, wherein the channels in the blades are substantially concentric.

26. The temperature-controlled K-mixer according to claim 1, wherein the channels are machined or drilled in said at least one plate.

27. The temperature-controlled K-mixer according to claim 26, wherein said at least one plate comprises a solid metallic plate.

28. The temperature-controlled K-mixer according to claim 26, wherein said at least one plate comprises two pieces of metal seal welded together, the plurality of channels being formed at the interface of the two pieces.

29. A temperature-controlled K-mixer for thermally and kinetically treating a material, the K-mixer comprising:
- a substantially cylindrical stationary chamber for containing the material, the chamber having a chamber inlet for receiving the material and a chamber outlet for discharging the material;
- a shaft assembly coaxial with the chamber and having a portion extending in the stationary chamber, the shaft assembly comprising:
  - an inner hollow shaft defining an inner passage extending therein;
  - an outer hollow shaft coaxially surrounding and spaced away from the inner hollow shaft, the outer hollow shaft forming an outer passage with the inner hollow shaft, the outer passage extending between the inner and outer hollow shafts, the inner and outer passages being in fluid communication with each other;
- a motor end connectable to a motor for rotating the shaft assembly;
- a joint end connectable to a rotary joint, the joint end having a fluid inlet and a fluid outlet, each communicating with a respective one of the inner and outer passages; and
- a plurality of blades extending from the outer hollow shaft in the stationary chamber, for mixing the material, the blades being respectively formed from at least one solid plate provided, the at least one plate having one or more channels extending within the solid plate, said at least one plate comprising opposed first and second lateral faces, said lateral faces being substantially planar, each blade comprising a channel inlet communicating with one of the passages, and a channel outlet communicating with the other one of the passages;

wherein the K-mixer is adapted for operating at speeds greater than 400 RPM and wherein the inner passage, the channels and the outer passage form a continuous flow path allowing a pressurized fluid to circulate within inner and outer hollow shafts and through the plurality of blades, from the fluid inlet to the fluid outlet, for controlling a temperature of the shafts and a temperature of the blades, allowing a flow of the fluid in the blades in an opposite direction of a rotational direction of the shaft assembly.

30. The temperature-controlled K-mixer according to claim 29, wherein at least one of the blades is twisted longitudinally.

* * * * *